United States Patent
Mao

(10) Patent No.: US 8,180,295 B2
(45) Date of Patent: May 15, 2012

(54) BLUETOOTH ENABLED COMPUTING SYSTEM AND ASSOCIATED METHODS

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1325 days.

(21) Appl. No.: 11/780,124

(22) Filed: Jul. 19, 2007

(65) Prior Publication Data

US 2009/0023499 A1    Jan. 22, 2009

(51) Int. Cl.
*H04B 7/00*    (2006.01)

(52) U.S. Cl. ............... 455/41.3; 455/41.1; 455/41.2; 455/575.2; 455/414.1; 455/426.1

(58) Field of Classification Search .............. 455/41.2, 455/41.3, 415, 436, 435.1, 412.1, 426.1, 455/509, 561
See application file for complete search history.

(56) References Cited

U.S. PATENT DOCUMENTS

| | | | |
|---|---|---|---|
| 5,189,416 A * | 2/1993 | Estes | 341/26 |
| 7,319,992 B2 * | 1/2008 | Gaos | 706/62 |
| 7,421,471 B2 * | 9/2008 | Van Datta | 709/205 |
| 7,652,660 B2 * | 1/2010 | Chen et al. | 345/156 |
| 7,818,003 B2 * | 10/2010 | Callaghan | 455/435.1 |
| 2004/0203835 A1 * | 10/2004 | Trottier et al. | 455/454 |
| 2005/0147247 A1 * | 7/2005 | Westberg et al. | 380/200 |
| 2006/0253595 A1 * | 11/2006 | Datta | 709/228 |
| 2006/0294230 A1 | 12/2006 | Takasu | |
| 2007/0021205 A1 * | 1/2007 | Filer et al. | 463/36 |
| 2007/0174467 A1 * | 7/2007 | Ballou et al. | 709/227 |
| 2008/0260125 A1 * | 10/2008 | Barnes et al. | 379/142.04 |
| 2009/0240821 A1 * | 9/2009 | Juncker et al. | 709/228 |

FOREIGN PATENT DOCUMENTS

JP    2005348224    12/2005

* cited by examiner

*Primary Examiner* — Edward Urban
*Assistant Examiner* — Ganiyu Hanidu
(74) *Attorney, Agent, or Firm* — Martine Penilla Group, LLP

(57) ABSTRACT

A host device is provided to include a processor, a memory, and a peripheral device communication port. The processor and the memory are defined to collectively execute a computer application. The host device is defined to establish a communication channel for a datastream associated with the computer application as transmitted through the peripheral device communication port. A bluetooth host chip is connected within the host device to enable bluetooth communication with a bluetooth client chip in an external device outside the host device. The host device is further defined to enable connection of the bluetooth client chip to the communication channel for the datastream, such that the datastream can be monitored by the external device.

24 Claims, 12 Drawing Sheets

BLUETOOTH ENABLED COMPUTING SYSTEM AND ASSOCIATED METHODS

BACKGROUND OF THE INVENTION

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation or Sony Playstation2 (PS2), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers continue to innovate to enable additional interactivity and computer programs. In reality, however, the way in which users interact with a game has not changed dramatically over the years. Commonly, users still play computer games using hand held controllers or interact with programs using mouse pointing devices.

SUMMARY OF THE INVENTION

In one embodiment, a bluetooth enabled computing system is disclosed. The system includes a host device that includes a processor, a memory, and a peripheral device communication port. The processor and memory are defined to collectively execute a computer application. The host device is defined to establish a communication channel for a datastream associated with the computer application, wherein the datastream is transmitted through the peripheral device communication port. Also, a bluetooth host chip is connected within the host device to enable bluetooth communication with a bluetooth client chip in an external device outside the host device. The host device is further defined to enable connection of the bluetooth client chip to the communication channel for the datastream, such that the datastream can be monitored by the external device.

In another embodiment, a method is disclosed for implementing bluetooth communication within a computing system. The method includes an operation for establishing within the computing system a communication channel with one or more peripheral control devices. The method also includes an operation for transmitting a datastream between the computing system and the one or more peripheral control devices by way of the communication channel. The method further includes establishing a bluetooth connection between a bluetooth client chip in an external device outside the computing system and a bluetooth host chip within the computing system. Additionally, an operation is provided for linking the bluetooth connection to the communication channel to enable monitoring of the datastream by the external device.

In another embodiment, a computing system for executing gaming applications is disclosed. The computing system includes a memory and a processor defined to operate in conjunction with the memory to execute a gaming application. The computing system also includes one or more controller devices connected to communicate with the processor by way of one or more respective datastreams. The processor is defined to associate the one or more datastreams with one or more communication channels. The computing system further includes a bluetooth host chip defined to enable bluetooth communication with a bluetooth client chip in an external device outside the computing system. The processor is further defined to enable connection of the bluetooth client chip, by way of the bluetooth host chip, to one or more selected communication channels, such that the one or more datastreams associated with the selected communication channels can be monitored by the external device.

Other aspects of the invention will become more apparent from the following detailed description, taken in conjunction with the accompanying drawings, illustrating by way of example the present invention.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
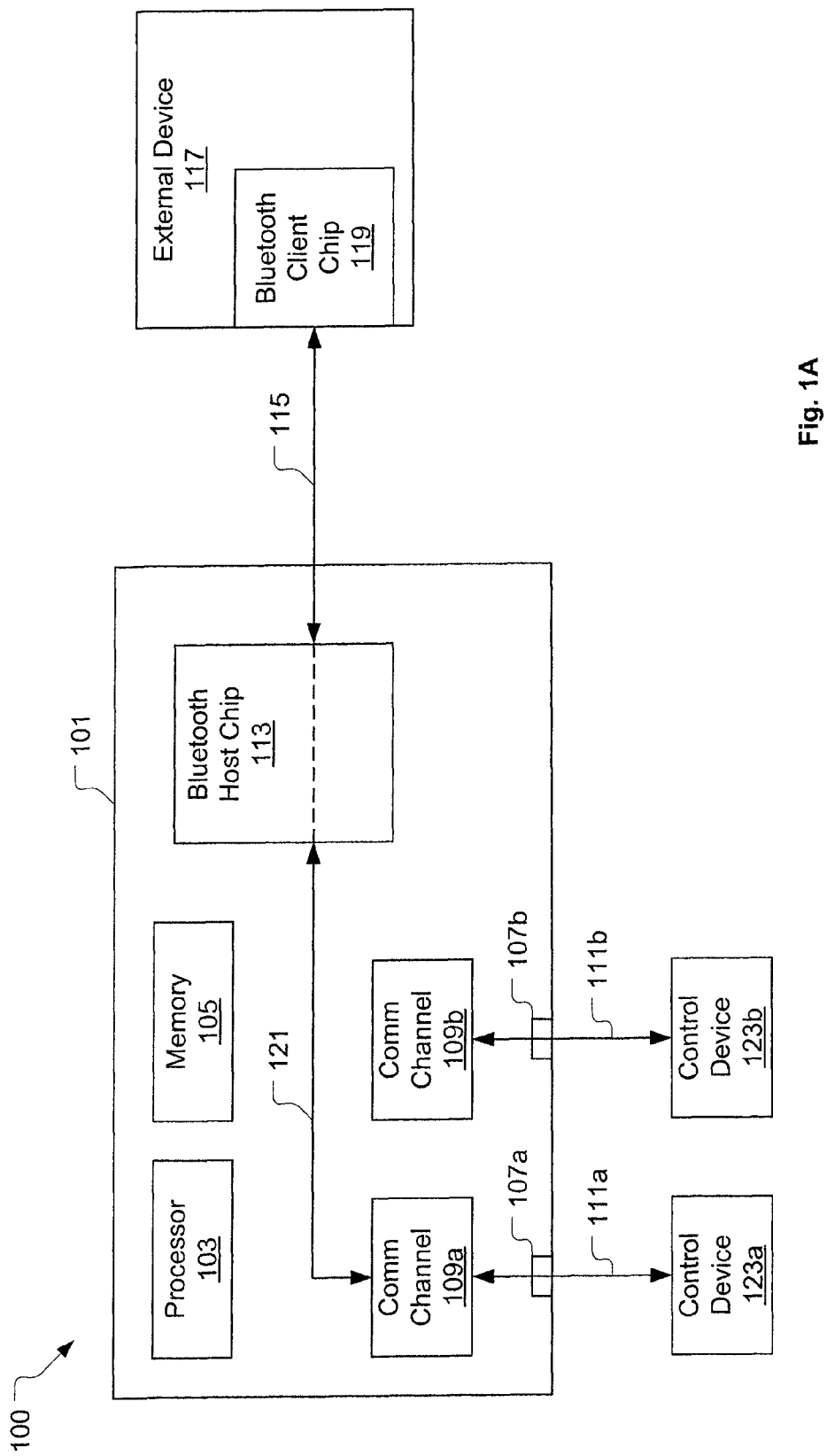
FIG. 1A is an illustration showing a bluetooth enabled computing system, in accordance with one embodiment of the present invention.

FIG. 1A is an illustration showing a bluetooth enabled computing system 100, in accordance with one embodiment of the present invention. The system 100 includes a host device 101 defined to include a processor 103 and a memory 105. In various embodiments, the host device 101 can be defined as essentially any type of computing system within which the processor 103 and the memory 105 are defined to collectively execute a computing application. For example, in one embodiment, the host device 101 can be defined as a gaming console, such as the Sony® Playstation 3® entertainment device. In another embodiment, the host device 101 can be defined as a general purpose computing system, such as a desktop, notebook or tablet computer, among others. In yet another embodiment, the host device 101 can be defined as a portable computing device, such as the Playstation Portable device.

The computing application to be executed by the host device 101 can be defined as essentially any type of computer software program that can be compiled in a computer executable form. For example, in one embodiment, the computing application is a gaming program defined primarily for entertainment or educational purposes. In another embodiment, the computing application is a business productivity program, such as a remote conferencing program, a spreadsheet program, a word processing program, a presentation program, a software development program, or a graphics development program, among many others. It should be understood, although particular exemplary embodiments are identified above for the host device 101 and the computing application to be executed thereby, the above-identified exemplary embodiments are not intended to represent an exhaustive set of possible embodiments.

The host device 101 is further defined to include a number of peripheral device communication ports 107a, 107b. Although FIG. 1A shows two exemplary peripheral device communication ports 107a, 107b, it should be understood that the host device 101 can include any number of such peripheral device communication ports. In various embodiments, the peripheral device communication ports 107a, 107b can be defined as essentially any type of communication port, such as a USB (universal serial bus) port, a parallel port, an infrared transceiver port, a radiofrequency transceiver port, or any other type of wired or wireless communication port. Thus, the peripheral device communication ports 107a, 107b are intended to represent any type of communication port defined to enable communication between the host device 101 and a peripheral control device.

By way of the processor 103 and memory 105, the host device 101 is defined to establish a number of communication channels 109a, 109b for a number of datastreams 111a, 111b associated with the executing computer application. Each of the number of datastreams 111a, 111b represents data communicated in either a uni-directional manner or a bi-directional manner between the host device 101 and a control device 123a, 123b. The data communicated between the host device 101 and the control device 123a, 123b can represent either input data received by the host device 101 or output data transmitted by the host device 101. Although FIG. 1A shows two exemplary communication channels 109a, 109b, and two exemplary datastreams 111a, 111b, it should be understood that the host device 101 is defined to establish any number of communication channels for any number of datastreams. Additionally, the number of communication channels (e.g., 109a, 109b) and the number of datastreams (e.g., 111a, 111b) can be different. For example, in one embodiment, a communication channel may be established by the host device 101 without being specifically associated with a datastream. In another embodiment, a datastream may be established by the host device 101 without being specifically associated with a communication channel.

The control device 123a, 123b can be essentially any type of peripheral device capable of providing input data to the host device 101, and in some embodiments also capable of receiving output data from the host device 101. For example, in one embodiment, the control device 123a, 123b can be defined as a controller or gamepad of a gaming system. In various other embodiments, the control device 123a, 123b can be defined as a keyboard, a keypad, a mouse, a microphone, a speaker, a display, a touchscreen, a video camera, among many others.

Figure 2:
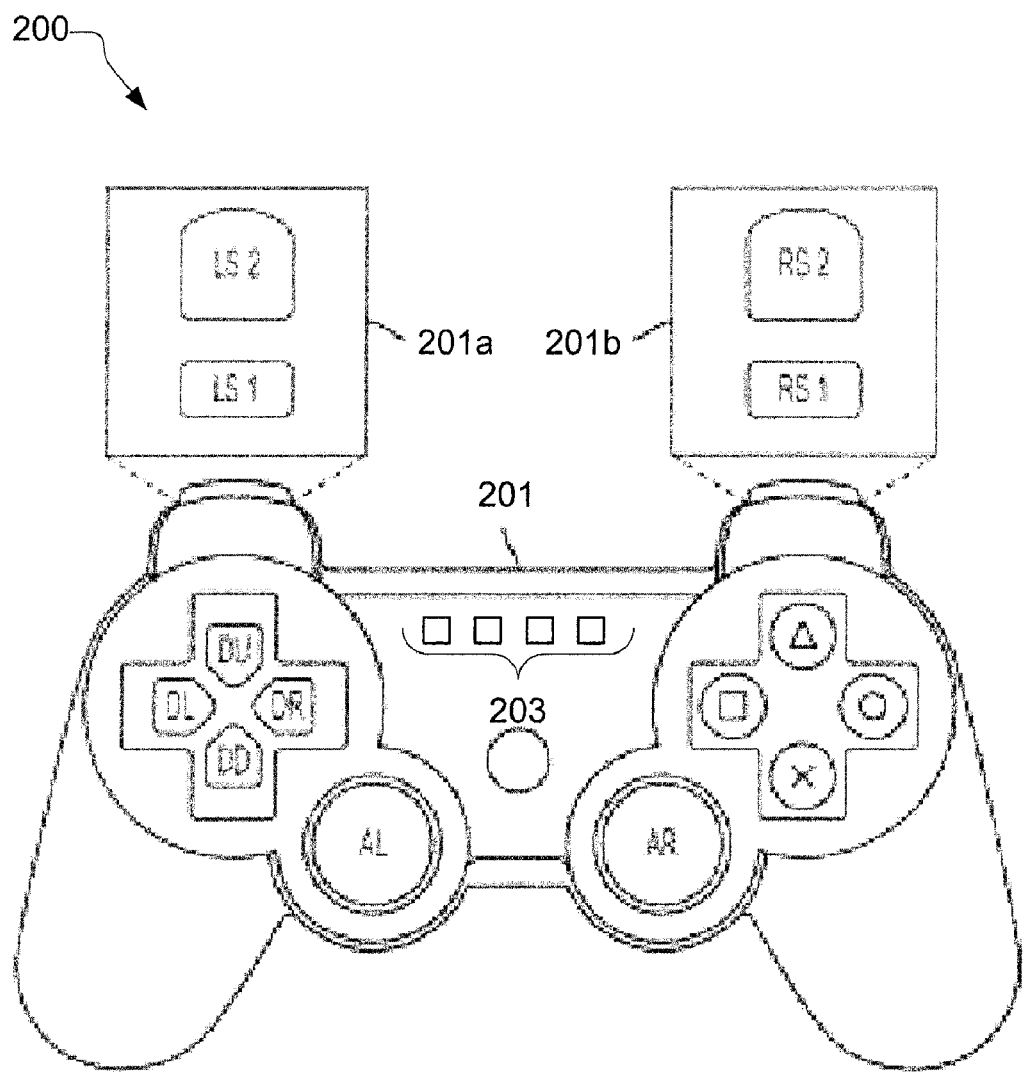
FIG. 2 is an illustration showing a controller of a gaming system suitable for use as the control device, in accordance with one embodiment of the present invention.

FIG. 2 is an illustration showing a controller 200 of a gaming system suitable for use as the control device (e.g., 123a, 123b), in accordance with one embodiment of the present invention. The controller 200 can have a variety of buttons including a digital control pad represented by DU, DR, DD and DL. The controller 200 can also have left shoulder buttons 201a that include LS1 and LS2. Similarly, right shoulder buttons 201b include RS1 and RS2. Analog sticks AL and AR can be included on the controller 200 where the analog sticks are also capable of acting as buttons when depressed. The controller can also include selection buttons illustrated as a square, a triangle, a circle, and an "X". The controller 200 can also include a number of LEDs 203. The embodiment of FIG. 2 shows the number of LEDs 203 defined on a top surface of the controller 200. However, other embodiments can have the LEDs 203 defined on a surface of the controller 200 other than the top surface. While particular names and symbols have been used to describe the exemplary controller 200, the names are exemplary and not intended to be limiting.

It should be appreciated that multiple control devices (e.g., 123a, 123b) can be associated with a common datastream (e.g., 111a, 111b), such that input from each of the multiple control devices is conducted through the common datastream to the host device 101, and output from the host device is conducted through the common datastream to each of the multiple control devices associated therewith. Therefore, although FIG. 1A shows a single control device 123a, 123b associated with each datastream 111a, 111b for clarity of description, it should be understood that in various embodiments multiple control devices can be associated with a common datastream.

The host device 101 also includes a bluetooth host chip 113 connected therein to enable establishment of a bluetooth connection 115 with a bluetooth client chip 119 in an external device 117 outside the host device 101, and to enable bluetooth communication over the bluetooth connection 115. The bluetooth host chip 113 is defined to enable registration of the bluetooth client chip 119 and communication with the bluetooth client chip 119, without consuming resources of the host device 101 used to execute the computing application, so as to avoid adversely impacting the performance of the computing application. Registration of the bluetooth client chip 119 with the bluetooth host chip 113 represents a pairing of the bluetooth client and host chips to enable bi-directional bluetooth communication between the bluetooth client chip 119 and the bluetooth host chip 113.

The processor 103 of the host device 101 is further defined to enable connection of the bluetooth client chip 119, by way of the bluetooth host chip 113 and bluetooth connection 115, to one or more selected communication channels (e.g., 109a, 109b) such that one or more datastreams (e.g., 111a, 111b) associated with the selected communication channels can be monitored by the external device 117. For example, in the embodiment of FIG. 1A, a connection 121 is established within the host device 101 between the bluetooth host chip 113 and the communication channel 109a such that the datastream 111a associated with the control device 123a and the communication channel 109a can be monitored by the external device 117 over the bluetooth connection 115.

In one embodiment, the host device 101 is defined receive a communication channel selection signal transmitted from the external device 117. The communication channel selection signal is defined to identify one or more communication channels within the host device 101 to which the external device 117 is to be connected, i.e., linked. The processor 103 of the host device 101 is defined to connect the bluetooth client chip 119 in the external device 117, by way of the bluetooth connection 115 and bluetooth host chip 113, to the one or more communication channels identified by the communication channel selection signal.

In one embodiment, the communication channel selection signal is generated and transmitted by the external device 117. In one version of this embodiment, the communication channel selection signal is transmitted over the bluetooth connection 115. In another version of this embodiment, the communication channel selection signal transmitted by another means not associated with the bluetooth connection 115. In another embodiment, the communication channel selection signal is generated and transmitted by a control device (e.g., 123a, 123b) connected to the host device 101.

It should be appreciated that in various embodiments, the communication channel selection signal can be generated by either mechanical, auditory, or visual means, then rendered in a format that can be communicated to the host device 101 and processed by the processor 103 within the host device 101. For example, in one embodiment, a button on the external device 117 can be used to generate the communication channel selection signal, the communication channel selection signal can then be rendered in a bluetooth communicatable format, and transmitted via the bluetooth connection 115 to the host device 101. In another exemplary embodiment, a microphone on the external device 117 can be used to generate the communication channel selection signal, the communication channel selection signal can then be rendered in a bluetooth communicatable format, and transmitted via the bluetooth connection 115 to the host device 101. In yet another exemplary embodiment, a button on a control device (e.g., 123a, 123b) can be used to generate the communication channel selection signal, the communication channel selection signal can then communicated via an associated datastream (e.g., 111a, 111b) to the host device 101.

Figure 1B:
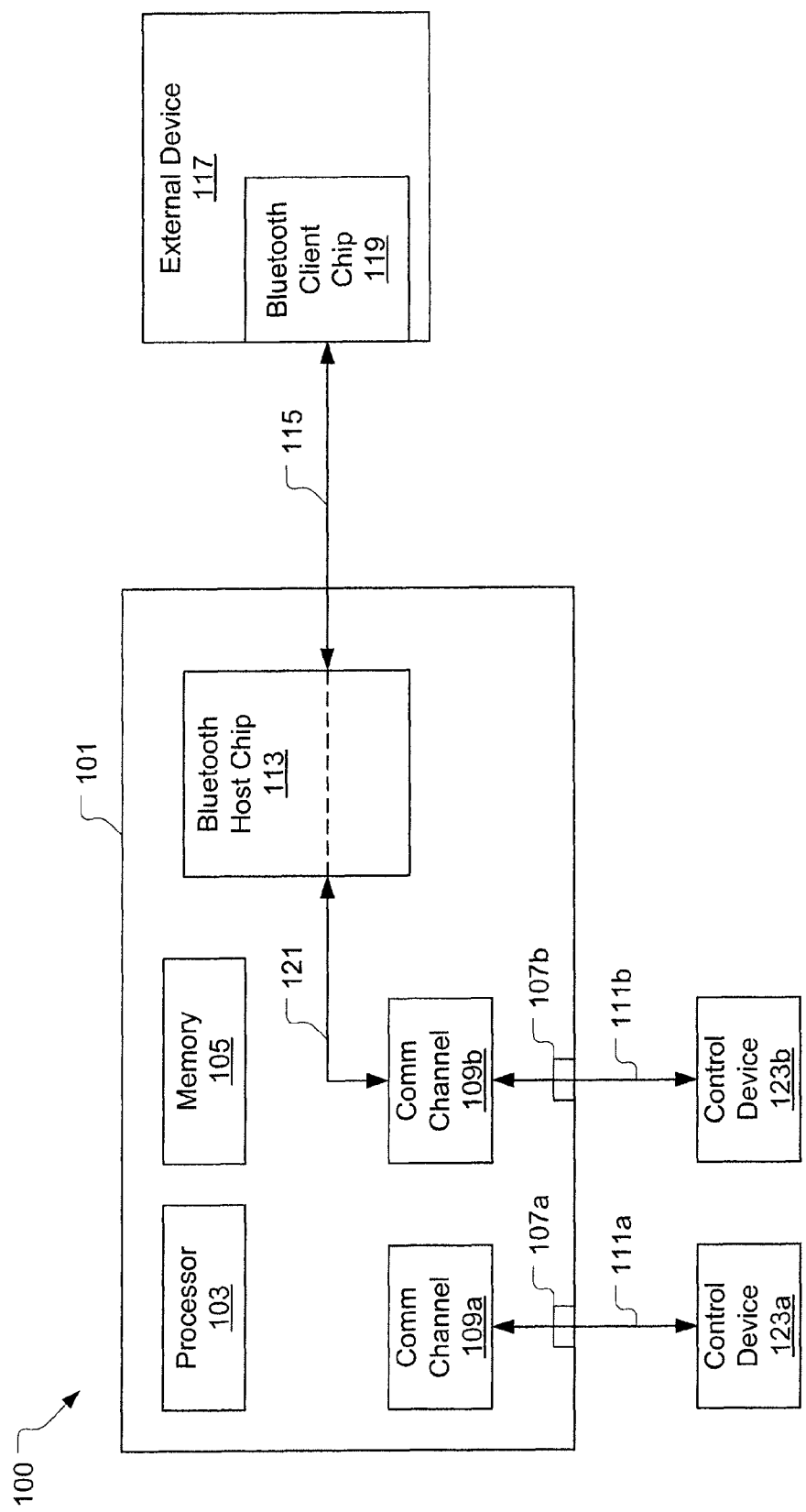
FIG. 1B is an illustration showing an external device connected to a second communication channel in accordance with a received communication channel selection signal, in accordance with one embodiment of the present invention.

In one embodiment, the communication channel selection signal is defined to identify a single communication channel established within the host device 101. In one version of this embodiment, the communication channel selection signal is received by the host device 101 as a pulse train defined by a successive number of pulses, wherein the number of successive pulses indicates a number identifier of the communication channel to which the external device 117 is to be connected. For example, as illustrated in FIG. 1B, a communication channel selection signal defined as a pulse train of two successive pulses, having been generated by a double-click of a button by a user of the external device 117, can direct the host device 101 to connect the external device 117 to a second communication channel, such that the external device 117 can monitor one or more datastreams associated with the second communication channel, by way of the bluetooth connection 115. It should be understood that the above-mentioned exemplary embodiments for generating and transmitting the communication channel selection signal to the host device 101 are provided as examples to facilitate description and are not intended to represent an exhaustive set of embodiments for generating and transmitting the communication channel selection signal.

In one embodiment, the processor 103 within the host device 101 is defined to generate and transmit a communication channel selection feedback signal upon connection of the bluetooth client chip 119 of the external device 117 to the communication channel (e.g., 109a, 109b) identified by the communication channel selection signal. In various versions of this embodiment, the communication channel selection feedback signal can be either a mechanical signal, an auditory signal, or a visual signal. For example, in one embodiment the communication channel selection feedback signal can be defined as a visual signal shown on a display associated with the host device 101. In another exemplary embodiment, the communication channel selection feedback signal can be conveyed by illuminating a number of LEDs on a control device (e.g., 123a, 123b) associated with the communication channel (e.g., 109a, 109b) to which the external device 117 is connected, wherein the number of illuminated LEDs indicates the number of the communication channel to which the external device 117 is connected. For example, a number of the LEDs 203 of the exemplary control device 200 shown in the embodiment of FIG. 2 can be illuminated to indicate the number of the communication channel to which the external device 117 is connected.

In yet another embodiment, the communication channel selection feedback signal can be conveyed audibly through a speaker to identify the communication channel (e.g., 109a, 109b) to which the external device 117 is connected. The speaker in this embodiment, may be defined in the external device 117, in the control device (e.g., 123a, 123b), or as another component connected to the host device 101. In yet another embodiment, the communication channel selection feedback signal can be conveyed mechanically as a vibratory pulse to identify the communication channel (e.g., 109a, 109b) to which the external device 117 is connected. The vibratory pulse in this embodiment, may be generated at the external device 117, at the control device (e.g., 123a, 123b), or at both the external device and the control device. It should be understood that the above-mentioned exemplary embodiments for generating and transmitting the communication channel selection feedback signal are provided as examples to facilitate description and are not intended to represent an exhaustive set of embodiments for generating and transmitting the communication channel selection feedback signal.

Figure 1C:
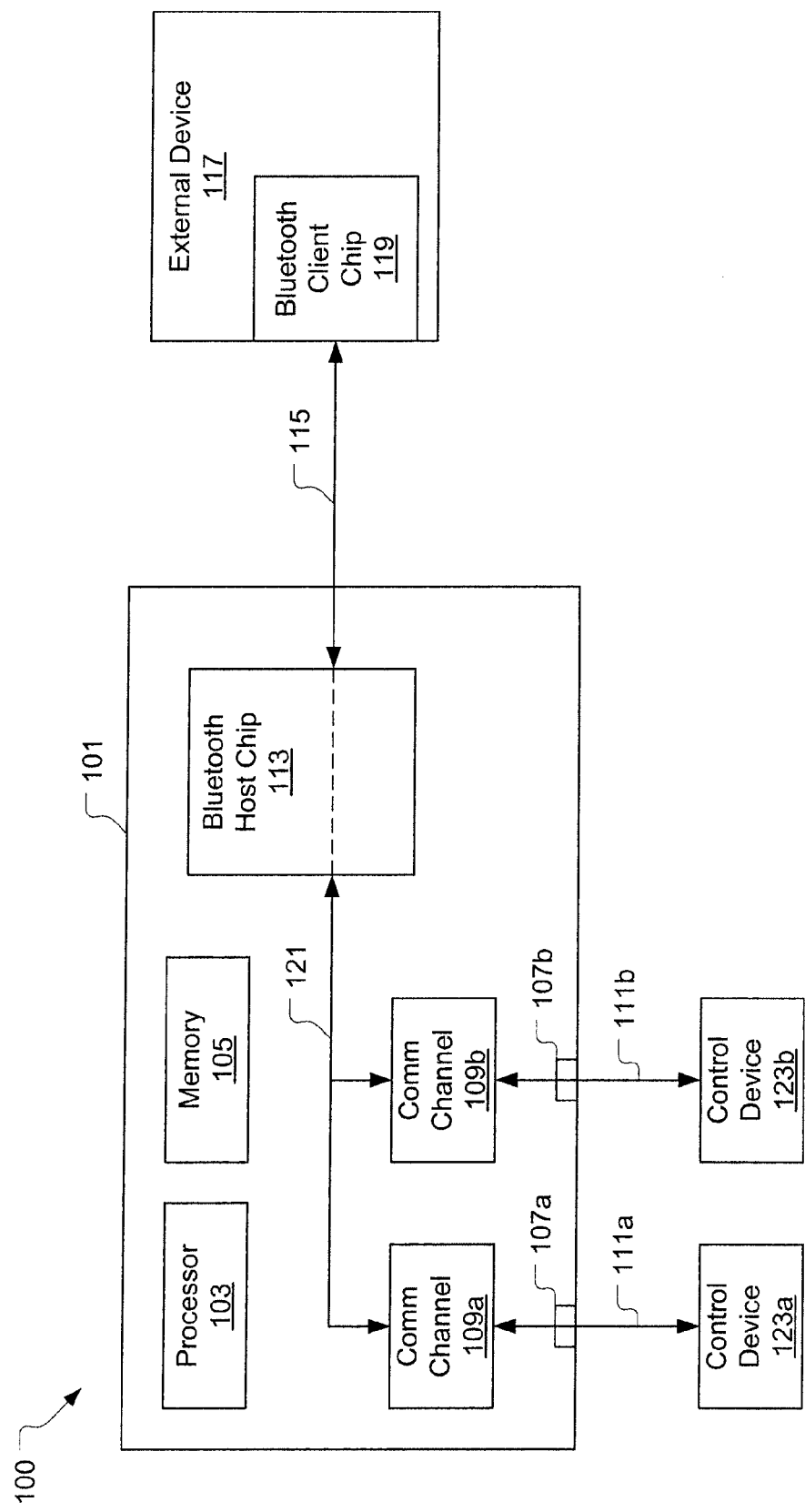
FIG. 1C is an illustration showing an external device connected to simultaneously monitor multiple communication channels, in accordance with one embodiment of the present invention.

As previously mentioned, in one embodiment, the external device 117 can be connected to simultaneously monitor multiple communication channels. FIG. 1C is an illustration showing the external device 117 connected to simultaneously monitor multiple communication channels (109a and 109b), in accordance with one embodiment of the present invention. It should be understood that the bluetooth host chip 113 is capable of receiving and managing multiple bluetooth connections.

Figure 1D:
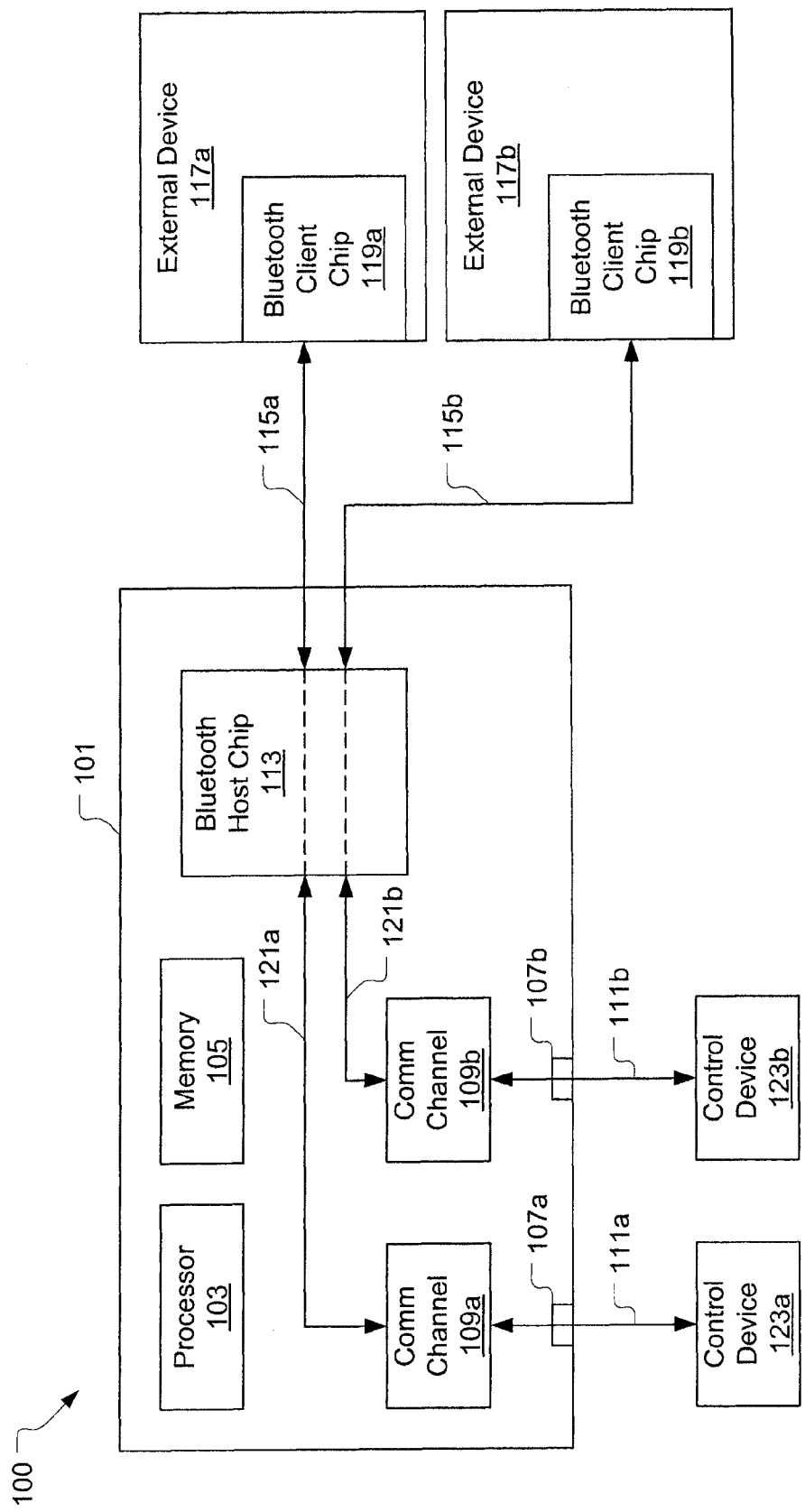
FIG. 1D is an illustration showing multiple external devices, each having a respective bluetooth client chip in bluetooth communication with the bluetooth host chip, as indicated by respective bluetooth connections, in accordance with one embodiment of the present invention.
Figure 1E:
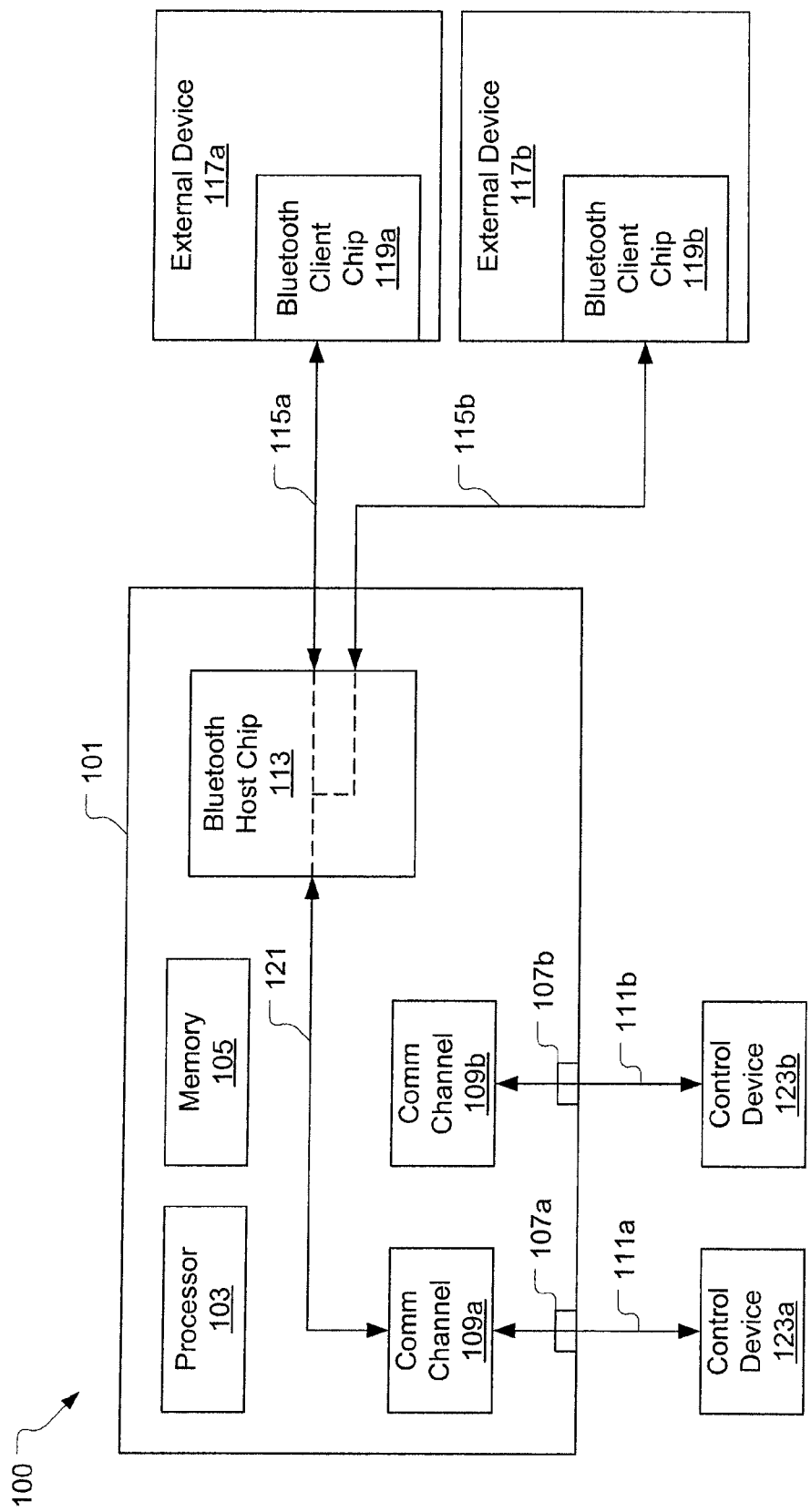
FIG. 1E is an illustration showing multiple external devices linked to a common communication channel, in accordance with one embodiment of the present invention.

FIG. 1D is an illustration showing multiple external devices 117a and 117b, each having a respective bluetooth client chip 119a and 119b in bluetooth communication with the bluetooth host chip 113, as indicated by respective bluetooth connections 115a and 115b, in accordance with one embodiment of the present invention. The processor 103 of the host device 101 is defined to independently connect the multiple bluetooth connections 115a and 115b to respectively selected communication channels. In the example of FIG. 1D, bluetooth connection 115a is linked to communication channel 109a, and bluetooth connection 115b is linked to communication channel 109b. FIG. 1E is an illustration showing the multiple external devices 117a and 117b linked to a common communication channel 109a, in accordance with one embodiment of the present invention. The processor 103 of the host device 101 is defined to enable connection of the multiple bluetooth connections 115a and 115b to the common communication channel 109a.

The external device 117 can take a variety of forms in different embodiments. In the various external device 117 embodiments, the host device 101 is defined to receive input data from the external device 117 by way of the corresponding bluetooth connection 115, and process the input data received from the external device 117 through the computer application executing on the host device 101. In various embodiments, the input data received from the external device 117 can represent either mechanical input, auditory input, or visual input having been sensed and converted into a bluetooth communicatable format.

Figure 3:
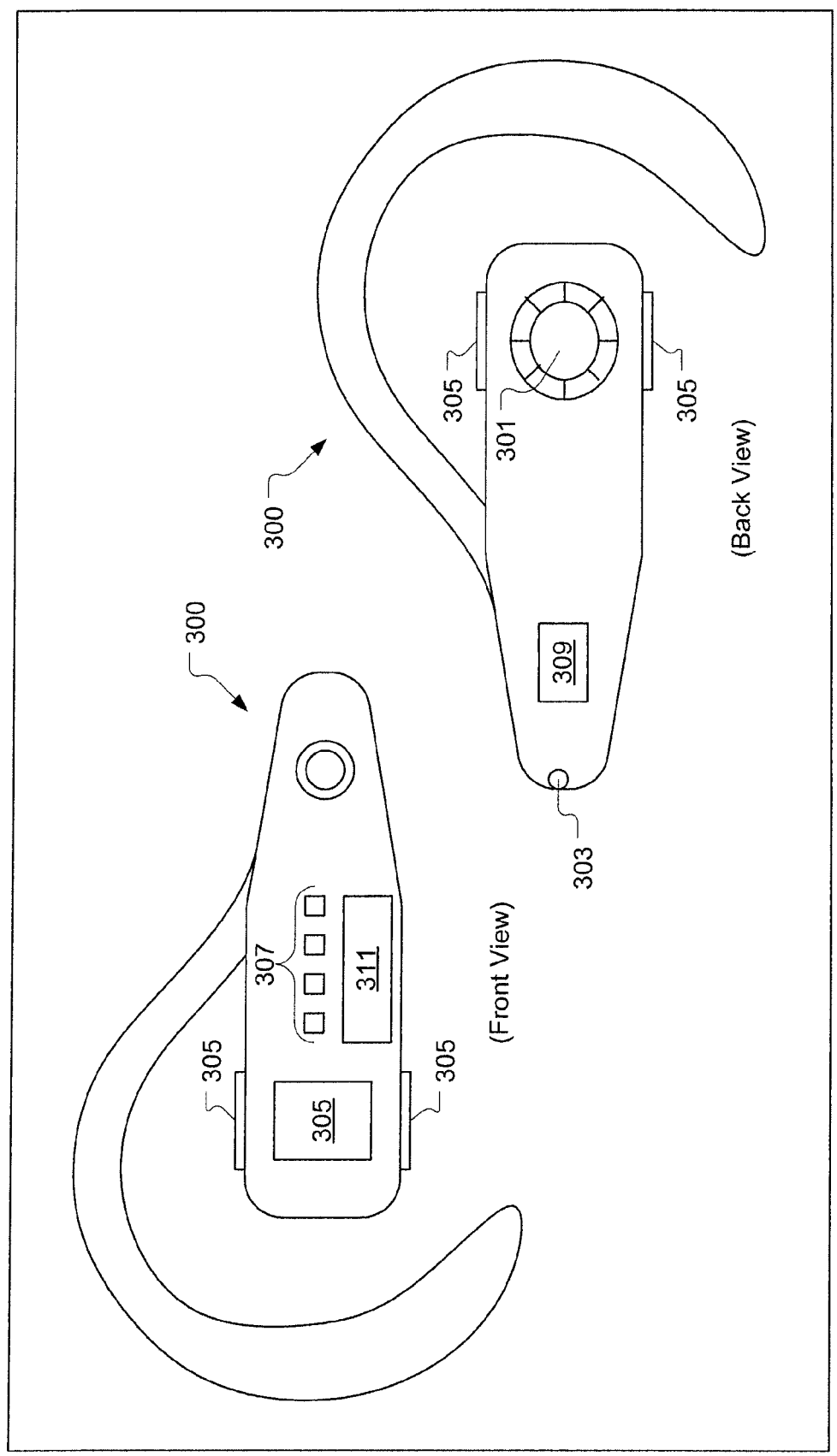
FIG. 3 is an illustration showing an exemplary bluetooth enabled earpiece suitable for use as the external device, in accordance with one embodiment of the present invention.

FIG. 3 is an illustration showing an exemplary bluetooth enabled earpiece 300 suitable for use as the external device 117, in accordance with one embodiment of the present invention. In one embodiment, the bluetooth enabled earpiece 300 includes a speaker 301, a microphone 303, and one or more buttons 305 to enable generation of data signals to be transmitted to the host device 101 through the bluetooth connection 115. In another embodiment, the bluetooth enabled earpiece 300 includes a number of LEDs 307. The number of LEDs 307 can be illuminated to indicate the number of the communication channel to which the external device 117 is connected. In another embodiment, the bluetooth enabled earpiece 300 includes a vibration generator 309 to convey received vibratory signals.

In yet another embodiment, the bluetooth enabled earpiece 300 includes a visual input system 311 through which visual data can be captured and converted to a bluetooth communicatable format. In one version of this embodiment, the visual input system 311 is defined by a light beam interruption sensor that detects interruptions of a generated light beam, and interprets the detected interruptions as data to be conveyed to the host device 101. In another version of this embodiment, the visual input system 311 is defined as a fingerprint scanner capable of capturing an image of a fingerprint, and transmitting the captured fingerprint image to the host device 101 for further processing. It should be appreciated that the external device 117 defined as the bluetooth enabled earpiece 300 can include a subset of the features explicitly identified in the above-mentioned exemplary embodiments, and/or a number of features not explicitly identified in the above-mentioned exemplary embodiments.

Figure 4:
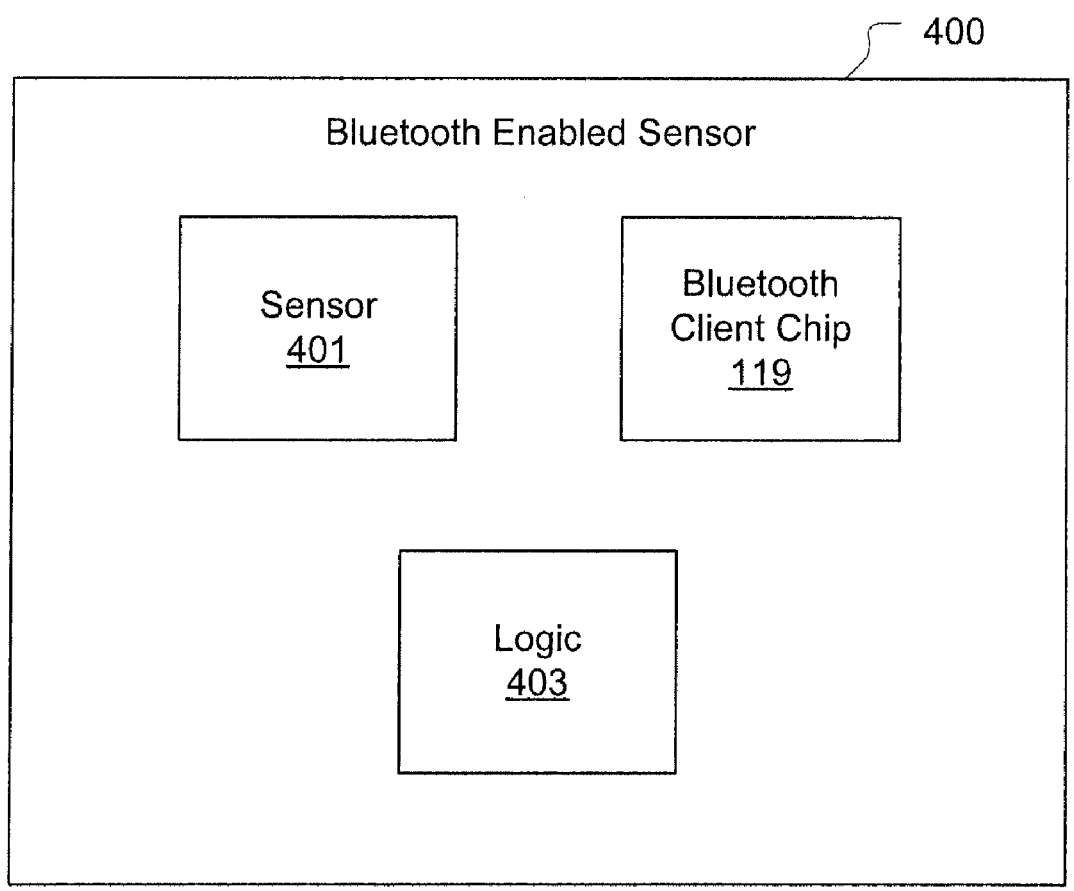
FIG. 4 is an illustration showing an exemplary bluetooth enabled motion sensor suitable for use as the external device, in accordance with one embodiment of the present invention.

FIG. 4 is an illustration showing an exemplary bluetooth enabled sensor 400 suitable for use as the external device 117, in accordance with one embodiment of the present invention. In one embodiment, the bluetooth enabled sensor 400 is equipped with a sensor 401 for detecting and/or measuring a position, an orientation, a movement, or a combination thereof, of the bluetooth enabled sensor 400. For example, in one embodiment the sensor 401 can be defined as an accelerometer to measure movement of the bluetooth enabled sensor 400 with regard to direction, acceleration, velocity, or a combination thereof In other exemplary embodiments, the sensor 401 may be defined as a gyroscopic sensor, a magnetic sensor, or a telematic sensor, among others types sensors. It should be understood that the sensor 401 can be defined as essentially any type of sensor capable of detecting and/or measuring the position, orientation, movement, or combination thereof, of the bluetooth enabled sensor 400.

The bluetooth enabled sensor 400 also includes logic 403 defined to translate detection/measurement signals received from the sensor 401 into data that can be communicated to the host device 101 via the bluetooth client chip 119 and bluetooth connection 115. For example, in one embodiment, position, orientation, and/or movement detected and conveyed by the bluetooth enabled sensor 400 can be used to direct the position, orientation, and/or movement of one or more objects within the computer application executing on the host device 101. Additionally, in one embodiment, multiple bluetooth enabled sensors 400 can be used to detect and convey position, orientation, and/or movement data to the host device 101 for controlling different aspects of one or more objects within the computer application executing on the host device 101.

Figure 5:
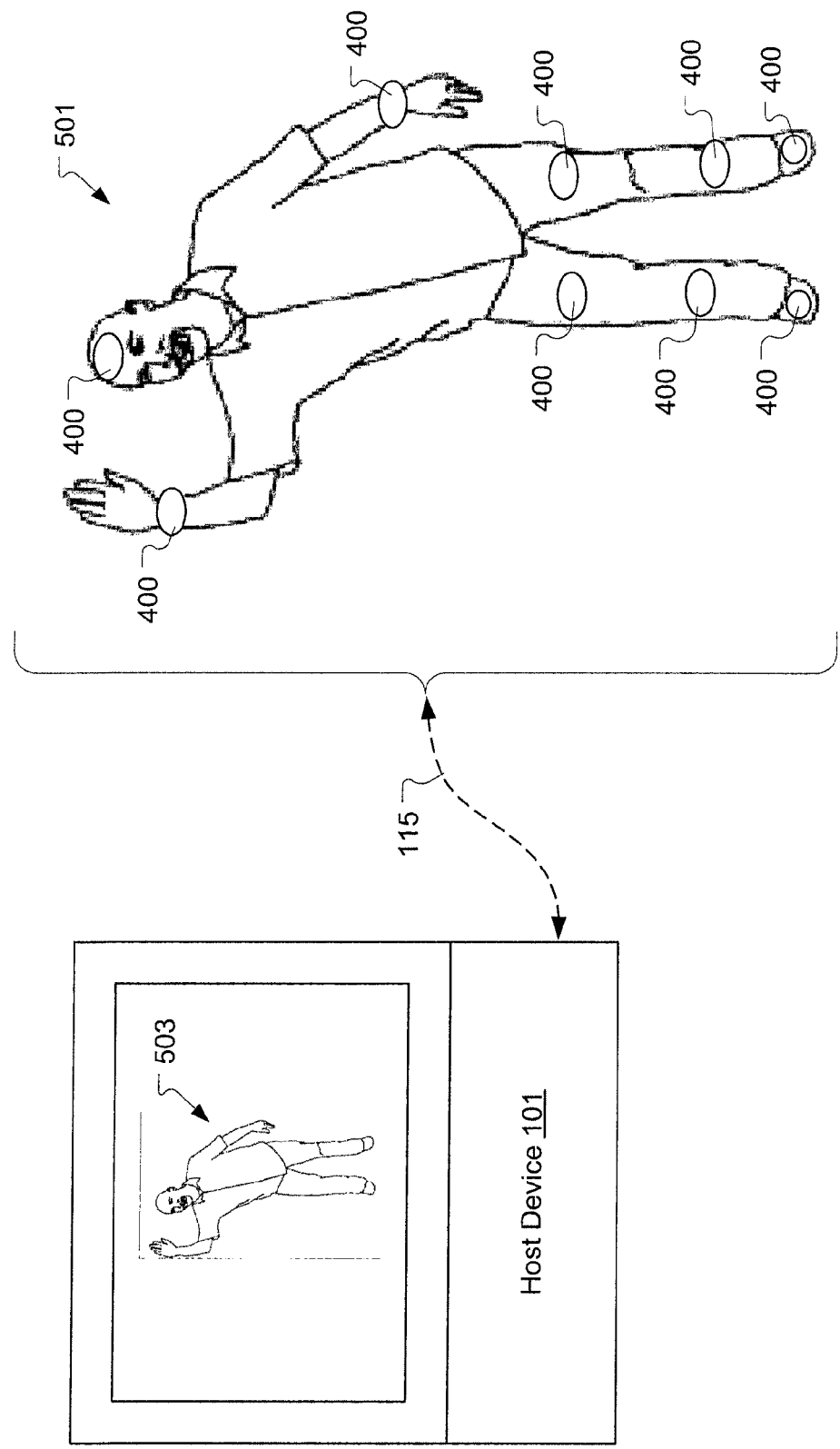
FIG. 5 is an illustration showing a number of the bluetooth enabled motion sensors deployed on various limbs of a real-world person interacting with a computer application executing on the host device, in accordance with one embodiment.

FIG. 5 is an illustration showing a number of the bluetooth enabled sensors 400 deployed on various limbs of a real-world person interacting with a computer application executing on the host device 101, in accordance with one embodiment. The movement of each limb of the real-world person 501 as detected and communicated by the various bluetooth enabled sensors 400 can be processed through the computing application to manipulate various virtual objects within the computing application. For example, the movement of limbs of the real-world person 501 may cause corresponding limbs of a virtual person 503 within the computing application to move in a similar manner. It should be understood that the above-mentioned embodiments associated with use of bluetooth enabled sensors 400 are provided to facilitate description and are not intended to represent an exhaustive set of embodiments for using the bluetooth enabled sensors 400. Additionally, it should be understood that one or more bluetooth enabled sensors 400 can be connected by respective bluetooth connections (e.g., 115), through the bluetooth host chip 113 to a one or more communication channels (e.g., 109a, 109b).

In one embodiment, the host device 101 is defined to require authorization of the external device 117 prior to connecting, i.e., linking, the associated bluetooth connection 115 to the requested communication channel (e.g., 109a, 109b). Authorization credentials for the external device 117 can be communicated to the host device 101 in a number of ways. For example, in one embodiment, the external device 117 communicates authorization credentials to the host device 101 by way of the bluetooth connection 115. In another embodiment, authorization credentials for the external device 117 are communicated to the host device 101 by way of a control device (e.g., 123a, 123b) and associated datastream (e.g., 111a, 111b).

In one embodiment, the host device 101 is defined to require authorization of the external device 117 prior to accepting certain types of input data received from the external device 117 by way of the bluetooth connection 115. For example, the host device 101 can be defined to restrict acceptance of input data from the external device 117 to a communication channel selection signal prior to authorization of the external device 117. In one embodiment, due to an assigned privilege level, an external device 117 may be restricted from providing input to a communication channel (e.g., 109a, 109b) to which it is connected and may only be allowed to passively monitor the communication channel through the associated bluetooth connection 115.

Figure 6:
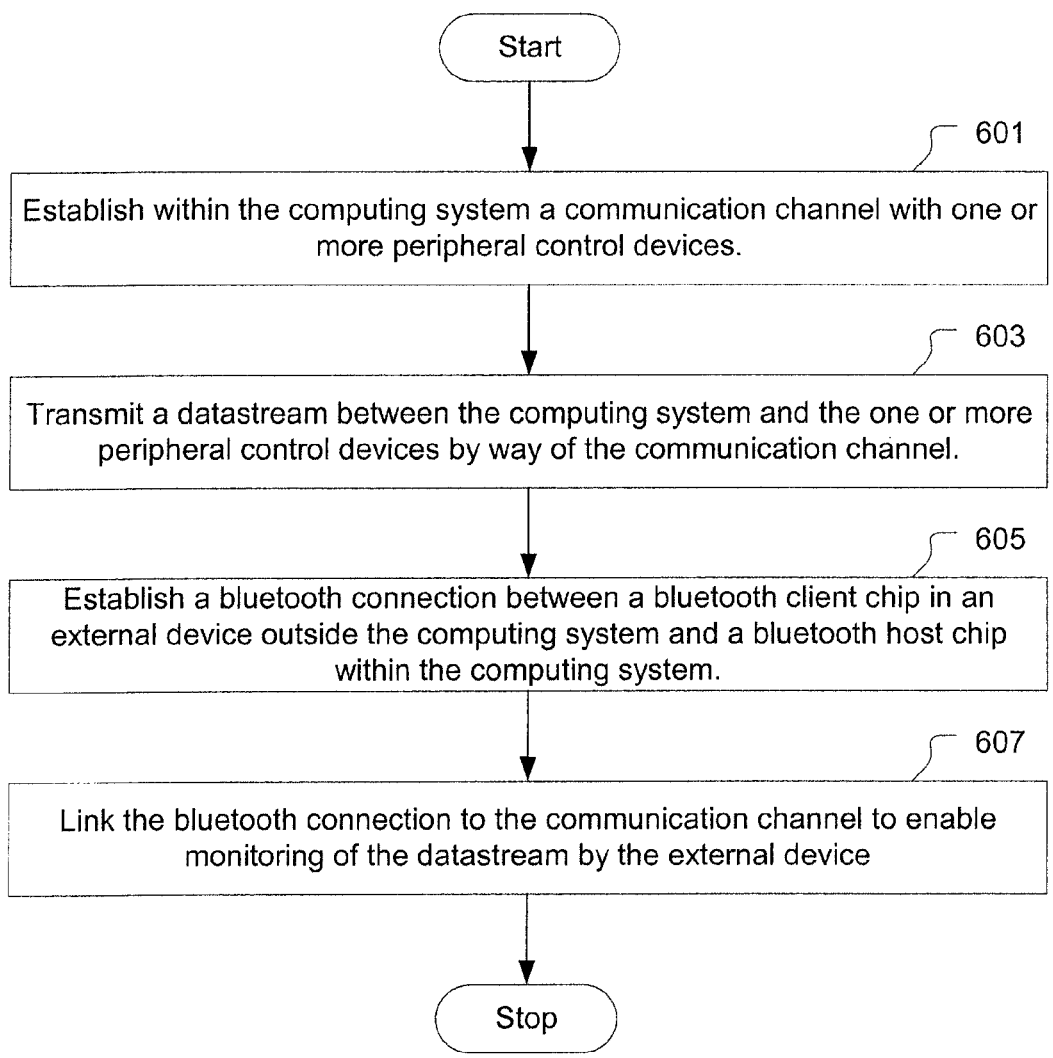
FIG. 6 is an illustration showing a flowchart of a method for implementing bluetooth communication within a computing system, in accordance with one embodiment of the present invention.

FIG. 6 is an illustration showing a flowchart of a method for implementing bluetooth communication within a computing system, in accordance with one embodiment of the present invention. The method includes an operation 601 for establishing within the computing system a communication channel with one or more peripheral control devices. In one embodiment, the method can include an operation for registering the bluetooth client chip in the external device with the bluetooth host chip in the computing system to enable establishment of the bluetooth connection between the bluetooth client chip and the bluetooth host chip in operation 601. The method also includes an operation 603 for transmitting a datastream between the computing system and the one or more peripheral control devices by way of the communication channel. The datastream is associated with a computer application being executed by the computing system.

The method further includes an operation 605 for establishing a bluetooth connection between a bluetooth client chip in an external device outside the computing system and a bluetooth host chip within the computing system. In various embodiments, the external device can be defined as a bluetooth enabled earpiece, or a bluetooth enabled motion sensor, among others. The method also includes an operation 607 for linking the bluetooth connection to the communication channel to enable monitoring of the datastream by the external device.

In one embodiment, the operation 601 can also be performed to establish within the computing system a plurality of communication channels with the one or more peripheral control devices. In one embodiment, one or more of the plurality of communication channels can represent a combination of one or more of the plurality of communication channels. In this embodiment, the operation 603 can also be performed to transmit a plurality of datastreams between the computing system and the one or more peripheral control devices by way of the plurality of communication channels when established in the operation 601. Also in this embodiment, an operation can be performed to receive a communication channel selection signal at the computing system from the external device by way of the bluetooth connection. An operation can then be performed to link the bluetooth connection to a communication channel identified by the communication channel selection signal. The method can further include an operation for transmitting a communication channel selection feedback signal from the computing system upon linking the bluetooth connection to the communication channel identified by the communication channel selection signal. The communication channel selection feedback signal can be either a mechanical signal, an auditory signal, or a visual signal that indicates the communication channel to which the bluetooth connection is linked.

In a further embodiment of the method, an operation can be performed to transmit a request for authorization credentials from the computing system prior to linking the bluetooth connection to the communication channel. An operation is then performed to receive authorization credentials at the computing system. An operation is then performed to verify the authorization credentials. Linking of the bluetooth connection to the communication channel to enable monitoring of the datastream by the external device is enabled upon verification of the received authorization credentials as acceptable.

It should be appreciated that embodiments of the present invention as described herein may be incorporated into a video game console. For example, in one embodiment, the bluetooth communication system described herein can be incorporated into the Sony®Playstation 3® entertainment device. It should be further appreciated that embodiments described herein may be implemented as either hardware, software, or a combination thereof.

Figure 7:
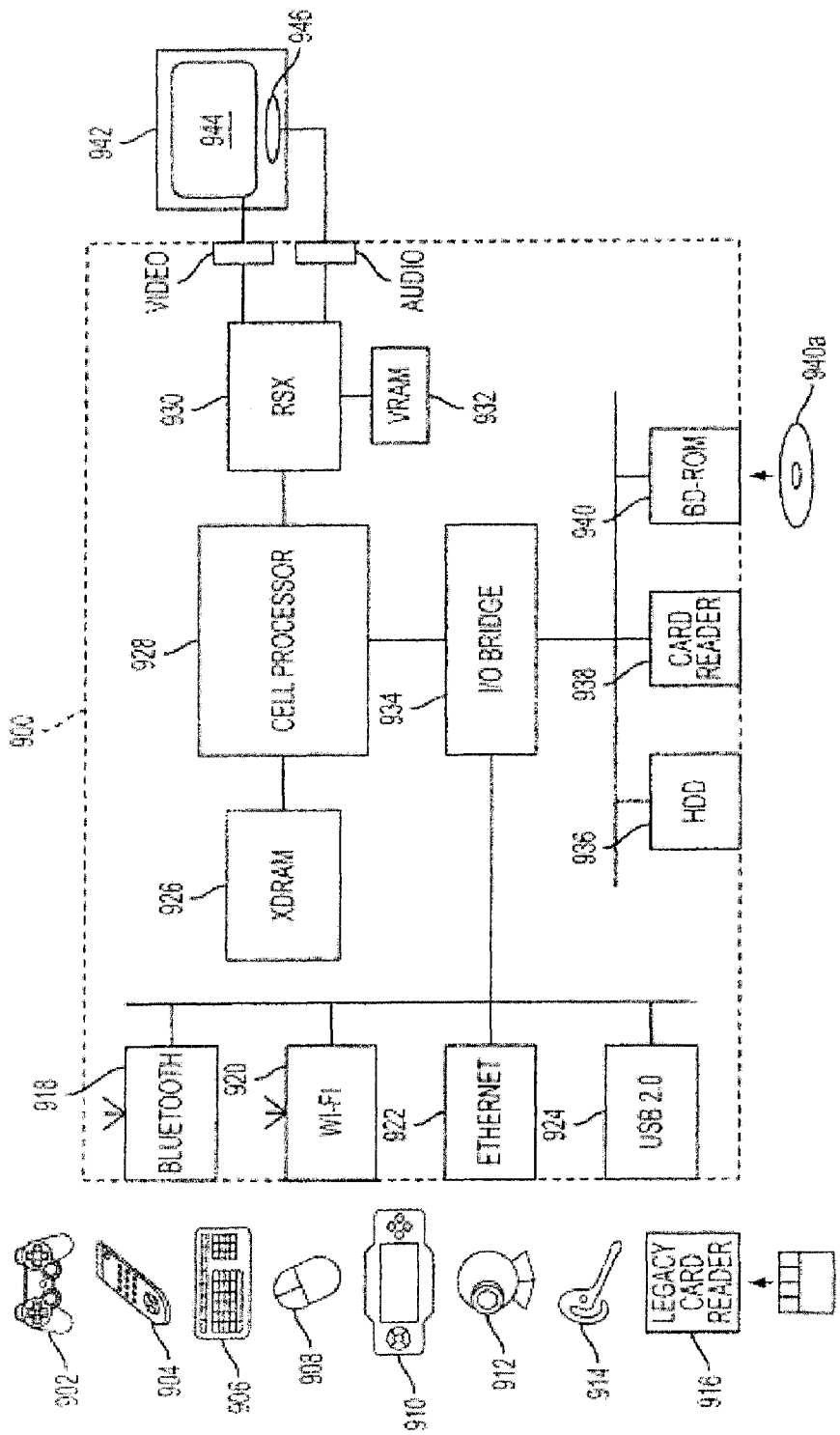
FIG. 7 schematically illustrates the overall system architecture of the Sony®Playstation 3® entertainment device, a console capable of implementing bluetooth communication in accordance with one embodiment of the present invention.

FIG. 7 schematically illustrates the overall system architecture of the Sony® Playstation 3® entertainment device, a console capable of implementing bluetooth communication in accordance with one embodiment of the present invention. A system unit 900 is provided, with various peripheral devices connectable to the system unit 900. The system unit 900 includes a Cell processor 928, a Rambus® dynamic random access memory (XDRAM) unit 926, a Reality Synthesizer graphics unit 930 with a dedicated video random access memory (VRAM) unit 932, and an I/O (input/output) bridge 934. The system unit 900 also includes a Blu Ray® Disk BD-ROM® optical disk reader 940 for reading from a disk 940a and a removable slot-in hard disk drive (HDD) 936, accessible through the I/O bridge 934. Optionally, the system unit 900 also includes a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924, a gigabit Ethernet port 922, an IEEE 802.11b/g wireless network (Wi-Fi) port 920, and a Bluetooth® wireless link port 918 capable of supporting of up to seven Bluetooth connections. In operation the I/O bridge 934 handles all wireless, USB and Ethernet data, including data from one or more game controllers 902. For example when a user is playing a game, the I/O bridge 934 receives data from the game controller 902 via a Bluetooth link and directs it to the Cell processor 928, which updates the current state of the game accordingly.

The wireless, USB, and Ethernet ports also provide connectivity for other peripheral devices in addition to game controllers 902, such as a remote control 904, a keyboard 906, a mouse 908, a portable entertainment device 910 such as a Sony Playstation Portable® entertainment device, a video camera such as an EyeToy® video camera 912, and a microphone headset 914. Such peripheral devices may therefore in principle be connected to the system unit 900 wirelessly. For example, the portable entertainment device 910 may communicate via a Wi-Fi ad-hoc connection, and the microphone headset 914 may communicate via a Bluetooth link. The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners. In addition, a legacy memory card reader 916 may be connected to the system unit via a USB port 924, enabling the reading of memory cards 948 of the kind used by the Playstation® or Playstation 2® devices.

In the present embodiment, the game controller 902 is operable to communicate wirelessly with the system unit 900 via the Bluetooth link. However, the game controller 902 can instead be connected to a USB port, thereby accessing power by which to charge the battery of the game controller 902. In addition to one or more analog joysticks and conventional control buttons, the game controller is sensitive to motion in six degrees of freedom, corresponding to translation and rotation in each axis. Consequently, gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 includes controls suitable for the operation of the Blu-Ray Disk BD-ROM reader 940 and for the navigation of disk content. The Blu Ray Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the PlayStation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors 950 may include conventional analogue and digital outputs whilst the video connectors 952 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 900, an appropriate piece of software such as a device driver should be provided. Device driver technology is well-known and is not be described in detail herein to avoid unnecessarily obscuring the present invention.

Figure 8:
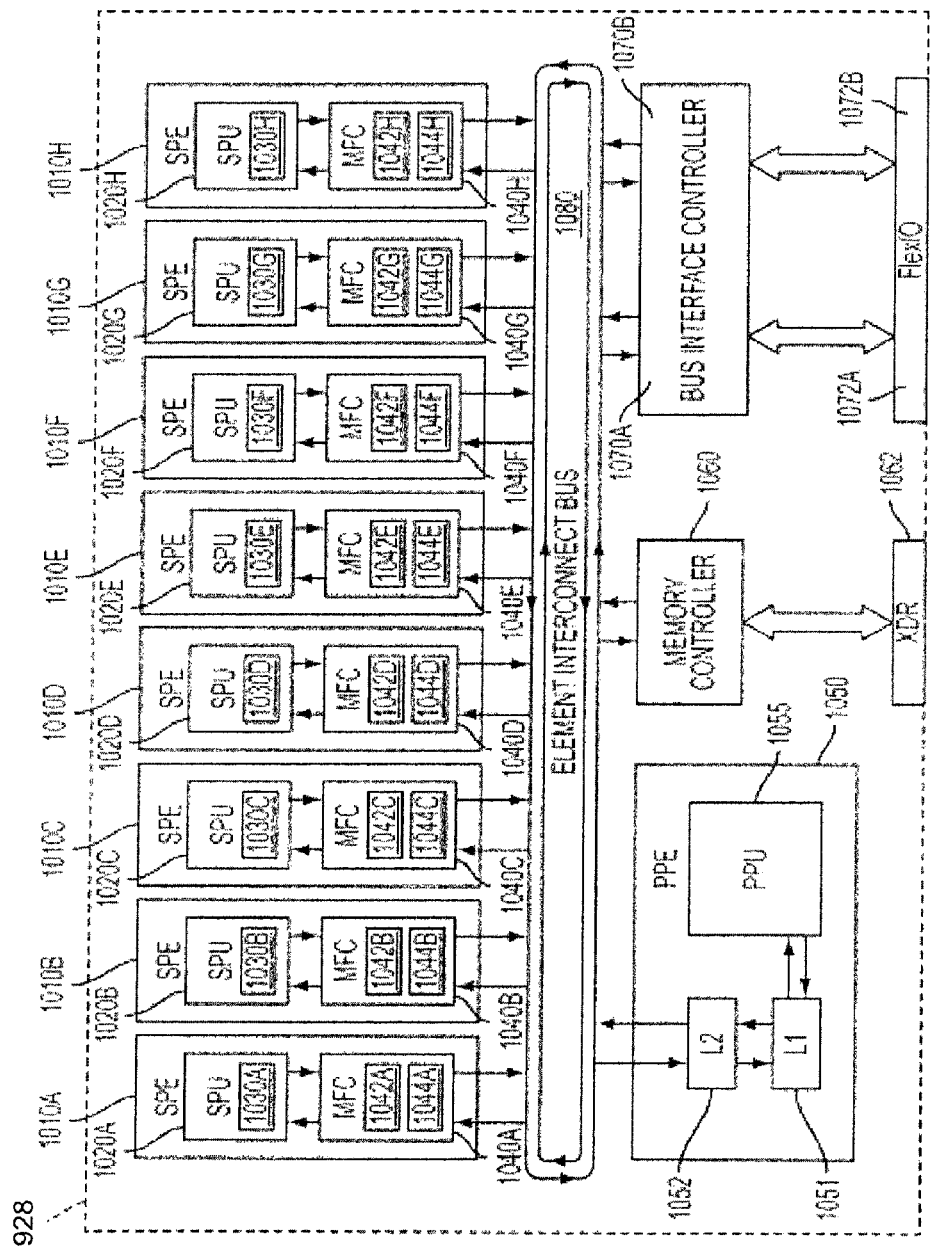
FIG. 8 is a schematic of the cell processor, in accordance with one embodiment of the present invention.

FIG. 8 is a schematic of the Cell processor 928, in accordance with one embodiment of the present invention. The Cell processor 928 has an architecture including four basic components: 1) external input and output structures including a memory controller 1060 and a dual bus interface controller 1070A,B; 2) a main processor referred to as the Power Processing Element 1050; 3) eight co-processors referred to as Synergistic Processing Elements (SPEs) 1010A-H; and 4) a circular data bus connecting the above components referred to as the Element Interconnect Bus 1080. The total floating point performance of the Cell processor is 218 GFLOPS.

The Power Processing Element (PPE) 1050 is based upon a two-way simultaneous multithreading Power 970 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently, each Synergistic Processing Element 1010A-H runs a kernel whose role is to fetch a job, execute it and synchronizes with the PPE 1050.

Each Synergistic Processing Element (SPE) 1010A-H includes a respective Synergistic Processing Unit (SPU) 1020A-H, and a respective Memory Flow Controller (MFC) 1040A-H including in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and including 256 kB local RAM 1030A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1020A-H does not directly access the system memory XDRAM 926. The 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the 8 SPEs 1010A-H, totaling 12 participants. Participants can simultaneously read and write to the bus at a rate of 8 bytes per clock cycle. As noted previously, each SPE 1010A-H comprises a DMAC 1042A-H for scheduling longer read or write sequences. The EIB comprises four channels, two each in clockwise and anti-clockwise directions. Consequently, for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s. The dual bus interface 1070A,B comprises a Rambus FlexIO® system interface 1072A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B. Data sent by the Cell processor 928 to the Reality Simulator graphics unit 930 will typically comprise display lists, being a sequence of commands to draw vertices, apply textures to polygons, specify lighting conditions, and so on.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Also, any of the operations described herein that form part of the invention can be performed by any suitable structural "means" that provide capability for performing the recited functionality. For instance, example structure is provided by way of the circuitry components referred to in the various embodiments of the claimed invention.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A bluetooth enabled computing system, comprising:
a host device including a processor, a memory, and a peripheral device communication port, wherein the processor and the memory are defined to collectively execute a computer application, the host device defined to establish a communication channel for a datastream associated with the computer application as transmitted through the peripheral device communication port;
a control device connected to the peripheral device communication port, the control device defined to transmit input signals through the peripheral device communication port to the host device, wherein the datastream includes data associated with the computer application as communicated between the control device and the host device; and
a bluetooth host chip connected within the host device to enable bluetooth connection and communication with a bluetooth client chip in an external device outside the host device,
wherein the communication channel for the datastream is established separate from the bluetooth connection between the bluetooth host chip and the bluetooth client chip, and
wherein the host device is further defined to enable connection of the bluetooth client chip to the communication channel for the datastream such that the datastream can be monitored by the external device.

2. A bluetooth enabled computing system as recited in claim 1, wherein the external device is a bluetooth enabled earpiece.

3. A bluetooth enabled computing system as recited in claim 1, wherein the host device is defined to establish a plurality of communication channels for a plurality of datastreams such that each of the plurality of communication channels can be associated with one or more of the plurality of datastreams.

4. A bluetooth enabled computing system as recited in claim 3, wherein the host device is defined to receive a communication channel selection signal transmitted from the external device and connect the bluetooth client chip in the external device to a communication channel identified by the communication channel selection signal.

5. A bluetooth enabled computing system as recited in claim 4, wherein the communication channel selection signal is transmitted as a pulse train, wherein the host device is defined to associate a number of successive pulses in the pulse train with a number of a communication channel to be selected.

6. A bluetooth enabled computing system as recited in claim 4, wherein the processor is defined to generate and transmit a communication channel selection feedback signal upon connection of the bluetooth client chip in the external device to the communication channel identified by the communication channel selection signal.

7. A bluetooth enabled computing system as recited in claim 6, wherein the communication channel selection feedback signal is either a mechanical signal, an auditory signal, or a visual signal.

8. A bluetooth enabled computing system as recited in claim 1, wherein the bluetooth host chip is defined to register the bluetooth client chip of the external device to enable communication between the bluetooth host chip and the bluetooth client chip.

9. A bluetooth enabled computing system as recited in claim 1, wherein the host device is defined to receive input data from the external device by way of the bluetooth communication and process the input data through the computer application, wherein the input data represents either mechanical input, auditory input, or visual input having been sensed and converted into a bluetooth communicatable format.

10. A bluetooth enabled computing system as recited in claim 9, wherein the host device is defined to restrict acceptance of input data received from the external device by way of the bluetooth communication to a communication channel selection signal.

11. A bluetooth enabled computing system as recited in claim 9, wherein the host device is defined to require authorization of the external device prior to accepting input data received from the external device by way of the bluetooth communication beyond a communication channel selection signal.

12. A method for implementing bluetooth communication within a computing system, comprising:
- operating the computing system to execute a computer application;
- establishing within the computing system a communication channel with one or more peripheral control devices defined to transmit input signals through the communication channel to the computing system;
- transmitting a datastream between the computing system and the one or more peripheral control devices by way of the communication channel, wherein the datastream is associated with the computer application executed by the computing system;
- establishing a bluetooth connection between a bluetooth client chip in an external device outside the computing system and a bluetooth host chip within the computing system, wherein the communication channel is established separate from the bluetooth connection between the bluetooth client chip and the bluetooth host chip; and
- linking the bluetooth connection to the communication channel to enable monitoring of the datastream by the external device.

13. A method for implementing bluetooth communication within a computing system as recited in claim 12, wherein the external device is a bluetooth enabled earpiece.

14. A method for implementing bluetooth communication within a computing system as recited in claim 12, further comprising:
- registering the bluetooth client chip in the external device with the bluetooth host chip in the computing system to enable establishment of the bluetooth connection between the bluetooth client chip and the bluetooth host chip.

15. A method for implementing bluetooth communication within a computing system as recited in claim 12, further comprising:
- establishing within the computing system a plurality of communication channels with the one or more peripheral control devices;
- transmitting a plurality of datastreams between the computing system and the one or more peripheral control devices by way of the plurality of communication channels;
- receiving a communication channel selection signal at the computing system from the external device by way of the bluetooth connection; and
- linking the bluetooth connection to a communication channel identified by the communication channel selection signal.

16. A method for implementing bluetooth communication within a computing system as recited in claim 15, wherein one or more of the plurality of communication channels represents a combination of others of the plurality of communication channels.

17. A method for implementing bluetooth communication within a computing system as recited in claim 15, further comprising:
- transmitting a communication channel selection feedback signal from the computing system upon linking the bluetooth connection to the communication channel identified by the communication channel selection signal, wherein the communication channel selection feedback signal is either a mechanical signal, an auditory signal, or a visual signal that indicates the communication channel to which the bluetooth connection is linked.

18. A method for implementing bluetooth communication within a computing system as recited in claim 12, further comprising:
- transmitting a request for authorization credentials from the computing system prior to linking the bluetooth connection to the communication channel;
- receiving authorization credentials at the computing system; and
- verifying the authorization credentials, wherein linking of the bluetooth connection to the communication channel to enable monitoring of the datastream by the external device is enabled upon verification of the received authorization credentials as acceptable.

19. A computing system for executing gaming applications, comprising:
- a memory;
- a processor defined to operate in conjunction with the memory to execute a gaming application;
- one or more controller devices connected to communicate input data for the gaming application with the processor by way of one or more respective datastreams, wherein the processor is defined to associate the one or more datastreams with one or more communication channels; and
- a bluetooth host chip defined to enable bluetooth connection and communication with a bluetooth client chip in an external device outside the computing system,
- wherein each of the one or more communication channels for the one or more datastreams is established separate from the bluetooth connection between the bluetooth host chip and the bluetooth client chip, and
- wherein the processor is further defined to enable connection of the bluetooth client chip by way of the bluetooth host chip to one or more selected communication channels such that the one or more datastreams associated with the selected communication channels can be monitored by the external device.

20. A computing system for executing gaming applications as recited in claim 19, wherein the external device is a bluetooth enabled earpiece.

21. A computing system for executing gaming applications as recited in claim 19, wherein the processor is defined to receive a communication channel selection signal from the external device by way of bluetooth communication and connect the bluetooth client chip in the external device to a communication channel identified by the communication channel selection signal.

22. A computing system for executing gaming applications as recited in claim 21, wherein the processor is defined to generate and transmit a communication channel selection feedback signal upon connection of the bluetooth client chip in the external device to the communication channel identified by the communication channel selection signal, wherein the communication channel selection feedback signal confirms connection of the bluetooth client chip to the selected communication channel.

23. A computing system for executing gaming applications as recited in claim 19, wherein the bluetooth host chip is defined to register the bluetooth client chip of the external device to enable communication between the bluetooth host chip and the bluetooth client chip.

24. A computing system for executing gaming applications as recited in claim 19, wherein the processor is defined to receive input data from the external device by way of the bluetooth communication and process the input data through the gaming application, wherein the input data represents either mechanical input, auditory input, or visual input having been sensed and converted into a bluetooth communicatable format.

* * * * *